United States Patent [19]

Fujii et al.

[11] Patent Number: 4,550,065
[45] Date of Patent: Oct. 29, 1985

[54] ELECTROLYTE CIRCULATION TYPE METAL-HALOGEN SECONDARY BATTERY

[75] Inventors: Toshinobu Fujii, Hino; Akira Kokado, Tokyo, both of Japan

[73] Assignee: Meidensha Electric Mfg. Co., Ltd., Tokyo, Japan

[21] Appl. No.: 367,666

[22] Filed: Apr. 12, 1982

[51] Int. Cl.⁴ .............................................. H01M 12/00
[52] U.S. Cl. .................................... 429/105; 429/198; 429/199; 429/19
[58] Field of Search ................. 429/21, 101, 198, 199, 429/105, 12, 13, 14, 15, 17, 19, 70.72, 34

[56] References Cited

U.S. PATENT DOCUMENTS 3,814,630  6/1974  Bjorkman, Jr. ............... 429/101 X
4,064,324  12/1977  Eustace ........................... 429/101
4,321,312  3/1982  Fujii et al. .................... 429/105 X
4,418,128  11/1983  Fujii ................................ 429/105

Primary Examiner—Anthony Skapars
Attorney, Agent, or Firm—Fleit, Jacobson, Cohn & Price

[57] ABSTRACT

The invention relates to an anode electrolyte comprising an aqueous solution of a metal bromide and a bromine complexing agent comprised of a tertiary amine for use in an electrolyte circulation type, metal-halogen secondary battery, and further, to an electrolyte circulation type, metal-halogen secondary battery in which a bromine complexing agent comprising a tertiary amine is added to an anode electrode comprised of an aqueous solution of a metal bromide. The anode electrolyte may advantageously further comprise an inorganic acid.

10 Claims, 8 Drawing Figures

ELECTROLYTE CIRCULATION TYPE METAL-HALOGEN SECONDARY BATTERY

BACKGROUND OF THE INVENTION

The present invention relates to electrolyte circulation type secondary batteries, particularly electrolyte circulation type metal-halogen secondary batteries. More particularly, the invention relates to a metal-bromine secondary battery which employs a complexing agent such that the complexing agent combines with the bromine molecules in the anode electrolyte so that the bromine molecules separated from the electrolyte form a bromine complex compound in an oily form and precipitate in the lower part of the anode electrolyte storage tank.

The electrolyte circulation type metal-halogen secondary batteries known in the art are basically constructed as shown in FIG. 1 of the accompanying drawing. In the Figure, numeral 1 designates a cathode, 2 a cathode chamber, 3 an anode, 4 an anode chamber, 5 a separator arranged substantially midway between the cathode 1 and the anode 3, 6 a cathode electrolyte storage tank, 7 an anode electrolyte storage tank, 8 an anode electrolyte including a bromine complex compound circulation means for putting the cathode chamber 2 in fluid communication with the cathode electrolyte storage tank 6 and for putting the anode chamber 4 in fluid communication with the anode electrolyte storage tank 7, which includes 9 electrolyte circulation pumps, 10 valves, and 11 a bypass for circulating the anode electrolyte containing no bromine complex compound.

While the metal used may be zinc, cobalt, cadmium or copper, if zinc is selected, for example, during charging a reaction of $Zn^{++} + 2e^- \rightarrow Zn$ takes place in the cathode chamber and a reaction of $2Br^- \rightarrow Br_2 + 2e^-$ takes place in the anode chamber. During discharging, the reverse reactions proceed.

Note that the cathode electrolyte consists of an aqueous solution of $ZnX_2$ (where X is a halogen atom) and the anode electrolyte consists of an aqueous solution of $ZnBr_2$, $Br_2$ and a bromine complexing agent.

The separator for dividing the two electrolyte chambers generally comprises a perforated membrane of polyolefin type or an ion exchange membrane.

When this type of secondary battery is charged, the bromine deposits onto the anode and the metal deposits onto the cathode. While the metal deposited onto the cathode is electrodeposited on the electrode plate, the bromine deposited onto the anode is dissolved into the electrolyte and circulated along with the electrolyte.

This is a disadvantage. During the operation of the battery, a part of the deposited bromine passes through the separator and reaches the metal side of the electrode pair thus causing a self-discharge threat. Also, the bromine itself is a highly corrosive substance, and, thus, limitations are imposed on the selection of materials for forming the battery.

In view of these restrictions, no electrolyte circulation type metal-halogen secondary battery has been put into practical use.

SUMMARY OF THE INVENTION

The inventors have made various studies of the foregoing deficiencies in the prior art, particularly the prevention of self-discharge, which is the principal disadvantage, and have made the present invention.

Therefore, it is the primary object of the invention to provide an improved electrolyte circulation type metal-halogen secondary battery in which the anode electrolyte includes a complexing agent which catches and reacts with the bromine deposited during the charging in such a manner that the bromine is separated from the electrolyte and precipitates as a bromine complex compound in the lower part of the anode electrolyte storage tank.

DESCRIPTION OF THE PREFERRED EMBODIMENTS

In the past, the use of quaternary ammonium salts as the complexing agent for achieving the above-mentioned object has been proposed. The electrolyte used in the above type of secondary battery system generally consists of an aqueous solution of metal bromide and the heretofore proposed quaternary ammonium salts dissolve into the electrolyte. Thus, the bromine deposited during charging combines with the quaternary ammonium salt and the resulting compound precipitates in the lower part of the anode storage tank. However, there is the disadvantage that the dissolution of the quaternary ammonium salt into the electrolyte decreases its electrical conductivity and the internal resistance of the battery is increased.

During discharging, the precipitated bromine complex compound and the upper electrolyte containing no bromine complex compound are mixed and transported to the electrode chamber and the bromine complex compound contributes to the electrode reaction.

The heretofore proposed quaternary ammonium salts are represented by the general formulas $R_4N^+ \cdot X^-$, $R_3R'N^+ \cdot X^-$ and $R_2R'_2N^+ \cdot X^-$ (in the formulas, R and R' are alkyl groups of $C_1$ to $C_3$ and X is a halogen, particularly a bromine ion or a chlorine ion). Other usable quaternary ammonium salts include, for example, a derivative of morpholine in which nitrogen atom is a member of the cyclic structure.

On the other hand, the complexing agents used in this invention consist of tertiary amines which are given by the general formula R R'R"N (where R, R' and R" are alkyl groups of $C_1$ to $C_4$ and these groups may be either the same or different from one another). In one embodiment at least one of R, R', or R" is $C_4$.

Generally, tertiary amines are not very soluble in water. These tertiary amines thus are not dissolved completely in the electrolyte of this invention and thus separate the electrolyte separates into two phases. As a result, the electrical resistance of the aqueous electrolyte solution is not increased and moreover the tertiary amine is combined with the bromine deposited during the charging to form a bromine complex compound. The resulting bromine complex compound dissolves into the complexing agent (the tertiary amine) and they form a single phase condition. Then, during the discharge the separated two phases, that is, an upper electrolyte and a lower bromine complex compound region (i.e., a single region which is a mixed region of the complexing agent and the bromine complex compound) are transported to the electrochemical reaction chamber (cell chamber) so that the bromine complex compound contacts the electrode surface, causes an electrochemical reaction and contributes as an active material.

The tertiary amines which can be used in this invention include trimethylamine, triethylamine, tripropylamine and tributylamine (including normal and iso) as well as those tertiary amines formed by hydrocarbon residues of different kinds.

Figure 1:
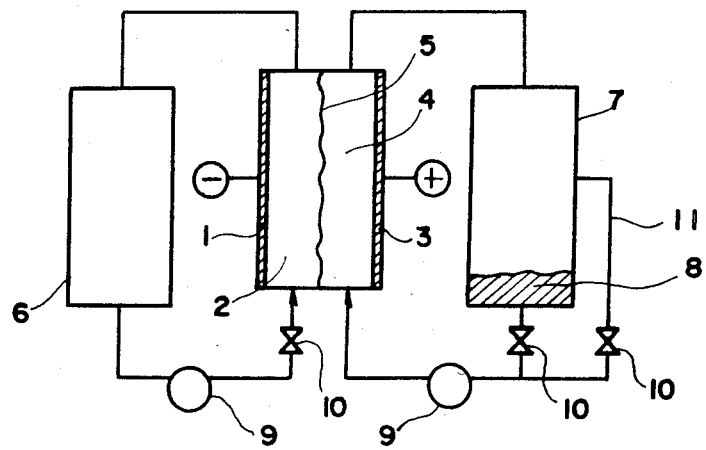
FIG. 1 is a schematic diagram showing the construction of a prior art metal-halogen secondary battery.

When a solution, in which an electrolyte and a complexing agent are separated into two phases as mentioned above, is used in the metal-halogen secondary battery, the battery construction shown in FIG. 1 hereinafter is generally used. The anode electrolyte storage tank 7 serves simultaneously as an electrolyte storage tank and a reaction chamber for the bromine and the complexing agent in the diphase electrolytes. As a result, a satisfactory contact must be ensured between the bromine dissolved in the upper region and the complexing agent in the lower region.

| Complexing Agent | K(mho cm$^{-1}$) | Electrolyte Composition |
| --- | --- | --- |
| $(C_2H_5)_4NBr$ | 0.106 | $ZnBr_2(3M) + (C_2H_5)_4NBr$ (0.2M) |
| $(CH_3)_3N$ | 0.081 | $ZnBr_2(3M) + (CH_3)_3N$ (0.9M) |
| $(C_2H_5)_3N$ | 0.075 | $ZnBr_2(3M) + (C_2H_5)_3N$ (0.9M) |
| $(C_3H_7)_3N$ | 0.110 | $ZnBr_2(3M) + (C_3H_7)_3N$ (0.9M) |

The above table shows the electrolyte conductivities obtained by using a quaternary ammonium salt cited as the comparative example and three tertiary amines cited as the examples of the complexing agents according to the invention. Since the aqueous zinc bromide electrolytic solution used has an electrical conductivity of 0.124 mho cm$^{-1}$ at room temperature, the use of tripropylamine is also advantageous from the standpoint of the battery's internal resistance since variation of the conductivity of the supernatant electrolyte is then not large.

Figure 2:
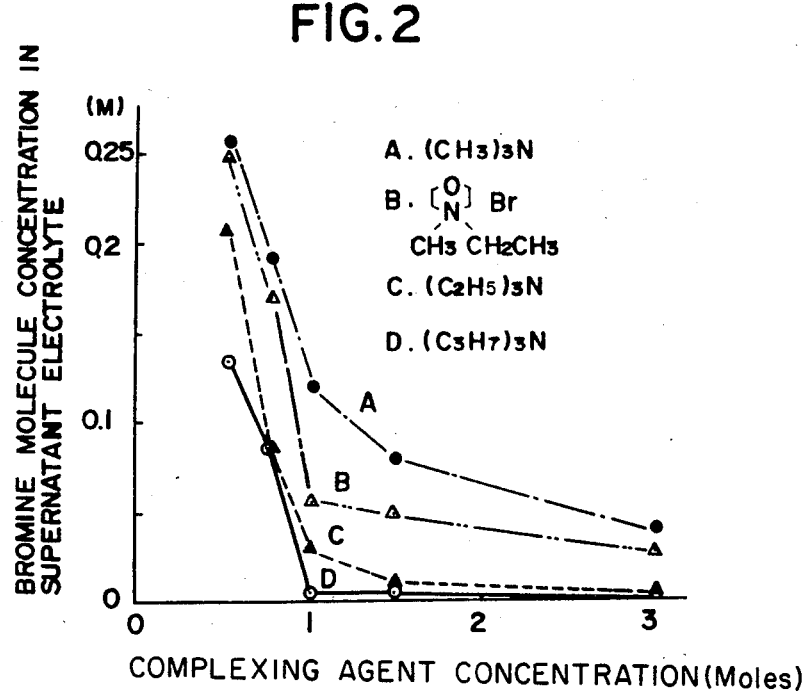
FIG. 2 is a characteristic diagram showing the relation between the concentration of complexing agent and the concentration of bromine molecules in the supernatant electolyte.

FIG. 2 shows the concentration of unabsorbed bromine molecules, left in the upper electrolyte when a given amount of bromine was dropped into an electrolyte containing complexing agent of varying concentrations and bromine complex compounds were formed. As will be seen from FIG. 2, among the complexing agents according to the present invention, the addition of tripropylamine, though small in quantity, had the effect of absorbing the bromine satisfactorily and the addition of 2.5 moles resulted in no trace of bromine in the supernatant electrolyte.

The use of acids in combination with the tertiary amines used has the effect of eliminating a certain property, i.e., the insolubility of these amines.

The acids which can be used for this purpose include inorganic acids, such as hydrochloric acid, nitric acid, sulfuric acid, and hydrobromic acid and organic acids having at least one carboxyl group, such as acetic acid, maleic acid and succinic acid.

The solubility of the tertiary amines in the electrolyte varies considerably with the proportion of acid used. For example, when one mole of tertiary amine is to be added to the electrolyte, theoretically it is only necessary to add one mole of the acid.

The following table shows the number of moles of hydrochloric acid or hydrobromic acid at the salting-out null point when one mole of an tetrtiary amine (trimethylamine or triethylamine) is added to an aqueous zinc bromide solution containing varying number of mole/liter of the zinc bromide.

| $ZnBr_2$ concentration (mol) | HCl (mole) $(CH_3)_3N$ (mol) | HCl (mole) $(C_2H_5)_3N$ (mol) | HBr (mole) $(CH_3)_3N$ (mol) | HBr (mole) $(C_2H_5)_3N$ (mol) |
| --- | --- | --- | --- | --- |
| 4 | 0.80 | 0.95 | 0.78 | 0.95 |
| 3 | 0.85 | 1.00 | 0.88 | 0.97 |
| 2 | 0.89 | 0.95 | 0.95 | 0.98 |

As will be seen from the above table, acids having substantially an equal number of moles as the tertiary amines are required.

Figure 3:
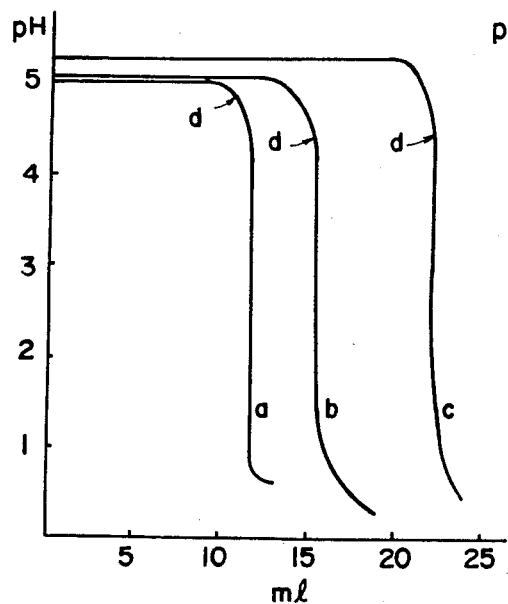
FIG. 3 is a characteristic diagram showing the variation of pH behavior due to the addition of hydrochloric acid to the positive electrode electrolyte.

FIG. 3 shows the pH variation of the anode electrolyte due to the addition of hydrochloric acid. In the Figure, the abscissa represents the amount in ml of 10% aqueous hydrochloric solution added to 50 ml of the anode electrolyte and the ordinate represents the corresponding pH value. The characteristic curves a, b and c show respectively at d the salting-out null points for molar ratios between zinc bromide and tertiary amines of 4:1, 3:1 and 2:1, respectively.

Figure 4:
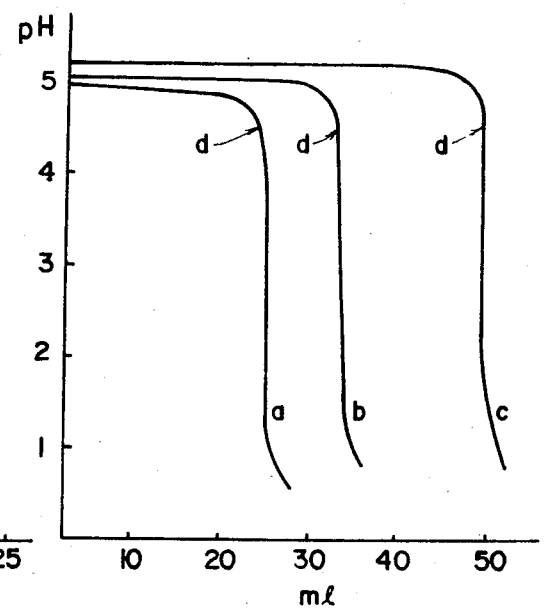
FIG. 4 is a characteristic diagram showing the variation of pH behavior due to the addition of hydrobromic acid in place of hydrochloric acid.

FIG. 4 shows the variations in the pH behavior of the anode electrolyte due to the addition of aqueous hydrobromic acid solution. The abscissa represents the addition in ml of 10% aqueous hydrobromic acid solution to 50 ml of the anode electrolyte and the ordinate represents the corresponding pH value. In the Figure, the characteristic curves a, b and c correspond to molar ratios between zinc bromide and the tertiary amine of 4:1, 3:1 and 2:1, respectively, and the salting-out null points are indicated at d like as in FIG. 3.

In both FIGS. 3 and 4, the pH of the electrolyte decreased suddenly when the aqueous acid solution was added in amounts exceeding those corresponding to the salting-out null points. While this decrease in pH value can be modified to describe a gentle curve by decreasing the concentration of the acid used, it is desirable to adjust the pH of the electrolyte to a value intermediate between the pH value indicated by the electrolyte itself and the pH value corresponding to the salting-out null point. If the adjustment of the pH value results in an excessively small value, the difference with respect to the zinc side electrolyte increases considerably and this causes a vigorous movement of the electrolytes through the separator due to the proton concentration difference.

Figure 5:
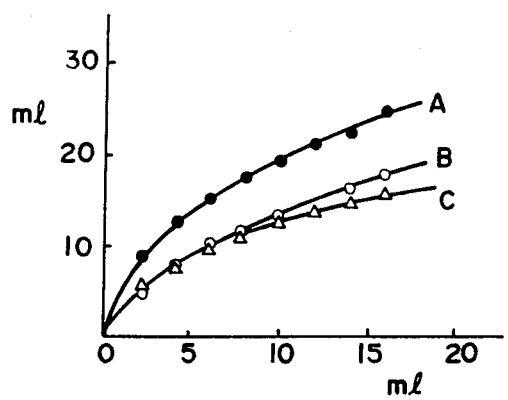
FIGS. 5, 6 and 7 show characteristic diagrams showing the behavior of the amount, density and viscosity of the formed bromine compound in relation to the dropwise addition of bromine into the electrolyte.
Figure 6:
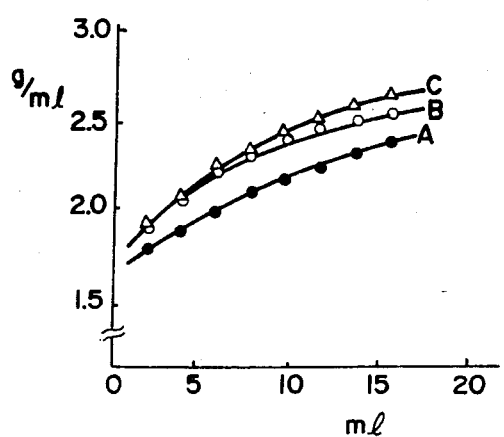
Figure 7:
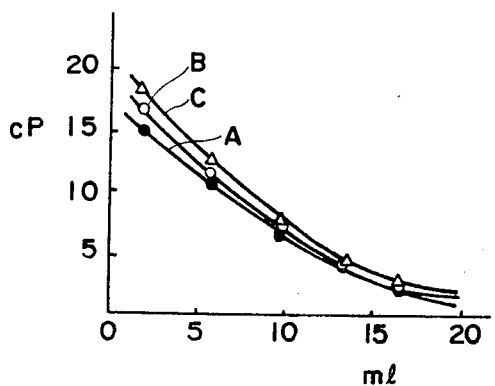

FIGS. 5, 6 and 7 show, respectively, the amount of absorbed bromine or the amount of bromine complex compound formed, its density and its viscosity which were obtained with the anode electrolyte in which the aqueous zinc bromide solution, triethylamine and hydrochloric acid (equal in molarity with the triethylamine) were adjusted by the above-mentioned method. In each of these Figures, the abscissa represents the amount of bromine ($Br_2$) added dropwise to 50 ml of the aqueous zinc bromide solution. With respect to the bromine complex compound formed, the amount is indicated in ml by the ordinate in FIG. 5, the density is indicated in g/ml by the ordinate in FIG. 6 and the viscosity is indicated in cP by the ordinate in FIG. 7. In FIGS. 5, 6 and 7, the curves A show the result of adding 10 g of triethylamine to 50 ml of an aqueous solution containing 3 moles of zinc bromide ($ZnBr_2$); the curves B show the results of adding 5 g of triethylamine to 50 ml of an aqueous solution containing 1 mole of $ZnBr_2$; and the curves C show the results of adding 5 g of triethylamine to 50 ml of an aqueous solution containing 3 moles of $ZnBr_2$.

Further, when 5 g of trimethylamine and an equimolar amount of hydrochloric acid were added to 50 ml of an aqueous solution containing 3 moles of $ZnBr_2$, and $Br_2$ was dropped into the resulting mixed aqueous solution, the formation behavior of bromine complex compound was confirmed as a tendency, such as shown in FIGS. 5, 6 and 7, and the same results were obtained when hydrobromic acid was used in place of the hydrochloric acid.

While the heretofore proposed quaternary ammonium salt has the disadvantage of increasing the amount of absorbed bromine (bromine complex compound) and thereby tending to solidify the oily complex compound, it has been confirmed that there was no solidified region in the cases where the tertiary amines and acids according to the invention were used.

The bromine complex compound according to the invention does not solidify and moreover as the amount of absorbed bromine increases, the viscosity decreases as shown in FIG. 7 with the result that, during the charging or discharging periods, the anode electrolyte is circulated easily, is easy to handle, reduces the head loss in the circulation system including the pumps, valves and liquid transfer pipes, flows uniformly within the anode chamber and ensures a satisfactory reaction at the electrode.

Where 2.5 moles of triethylamine was dissolved with hydrochloric acid in 50 ml of an aqueous solution containing 0.5 moles of $ZnBr_2$ and 6.4 ml of $Br_2$ was dropped into the resulting solution, it was confirmed that the concentration of the bromine in the electrolyte was substantially zero, that is, practically all of the $Br_2$ was converted to a bromine complex compound. This amount of $Br_2$ corresponds to an 80% charged level for the metal-bromine battery.

From the foregoing detailed description, it will be seen that in accordance with the invention there is provided an electrolyte circulation type metal-bromine secondary battery in which an anode electrolyte using bromine as the positive active material, is prepared by adding a tertiary amine represented by the general formulas of $R_3N$, $R_2R'N$, $RR'_2N$ or $RR'R''N$ and an inorganic acid or an organic acid, to an aqueous solution of a metal bromide (e.g., zinc bromide). During the charging period, the bromine molecules formed in the anode chamber are absorbed by the bromine complexing agent consisting of a tertiary amine and an acid, and a bromine complex compound is formed which practically has no danger of solidification and is low in viscosity. Thus, the present invention can realize an electrolyte circulation type metal-halogen secondary battery capable of easily realizing an anode electrolyte circulation system, ensuring a uniform flow distribution and eliminating deficiencies due to free bromine.

Where a complexing agent is used in accordance with the invention, the rate of reaction between the free bromine and the complexing agent can be increased by arranging in a relatively lower complexing agent retaining portion of the anode electrolyte storage tank, preferably adjacent to the electrolyte exiting port, a filter which is designed so that when the electrolyte is circulated, the complexing agent is prevented from flowing out and the contact area with the electrolyte is increased.

In order to effect the reaction efficiently, it is desirable to use a filter having a large number (innumerable) of fine perforations and practically equal in area with the bottom surface of the storage tank. A preferred exemplary filter is a glass fiber filter of a suitable thickness.

Figure 8:
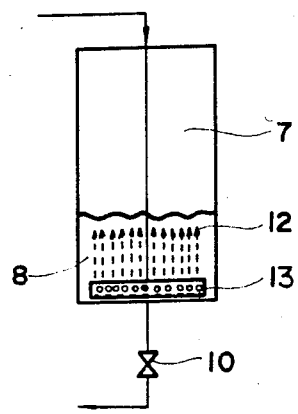
FIG. 8 shows the electrolyte storage tank of FIG. 1 in which a filter is arranged in the lower part of the storage tank.

FIG. 8 shows an example of the filter. In the Figure, numeral 7 designates the anode electrolyte storage tank (the bromine electrolyte tank) of FIG. 1, 8 the bromine complex compound region formed by the complexing agent comprising the tertiary amine, 13 the filter, and 12 separated particles in the electrolyte.

On discharge, the valve 10 is opened so that the electrolyte circulated from the cell chamber 4 to the electrolyte storage tank 7 is returned again to cell chamber 4 from the electrolyte storage tank 7 via the filter 13. On charging, the electrolyte is circulated in the reverse order.

It will thus be seen from the foregoing description that, in accordance with the present invention, the bromine deposited during the operation of the battery has no danger of reaching the metal side of the electrode pair and causing self-discharge; also there is no danger of any decrease in the electrical conductivity of the electrolyte and of any increase in the battery internal resistance, thereby ensuring excellent performance.

We claim:

1. An electrolyte circulation type metal-halogen secondary battery, comprising:
   a cell chamber which is divided into a cathode chamber and an anode chamber by a separator;
   a cathode electrolyte storage tank in fluid communication with said cathode chamber by means of a circulation means;
   an anode electrolyte storage tank in fluid communication with said anode chamber by means of a circulation means; and
   an anode electrolyte contained in the anode chamber, said electrolyte comprising an aqueous solution of a metal bromide, a bromine complexing agent comprised of a tertiary amine having at least one alkyl group, and an inorganic acid.

2. A secondary battery according to claim 1, wherein the tertiary amine is represented by the general formula $RR'R''N$ in which R, R' and R'' are one or more kinds of alkyl groups selected from the group consisting of methyl, ethyl, propyl and butyl, wherein at least one group is a butyl group.

3. A secondary battery according to claim 1, wherein the metal bromide is zinc bromide.

4. A secondary battery according to claim 1, wherein the inorganic acid is selected from the group consisting of hydrochloric acid, sulfuric acid, nitric acid, hydrobromic acid, and mixtures thereof.

5. A secondary battery according to claim 1, wherein the tertiary amine and the inorganic acid are present in equimolar amounts.

6. An anode electrolyte for use in an electrolyte circulation type metal-halogen secondary battery, said electrolyte comprising:
   an aqueous solution of a metal bromide;
   a bromine complexing agent comprised of a tertiary amine having at least one alkyl group; and
   an inorganic acid.

7. An anode electrolyte according to claim 6, wherein the tertiary amine is represented by the general formula RR'R''N in which R, R' and R'' are one or more kinds of alkyl groups selected from the group consisting of methyl, ethyl, propyl and butyl, wherein at least one group is a butyl group.

8. An anode electrolyte according to claim 6, wherein the metal bromide is zinc bromide.

9. An anode electrolyte according to claim 6, wherein the inorganic acid is selected from the group consisting of hydrochloric acid, sulfuric acid, nitric acid, hydrobromic acid, and mixtures thereof.

10. An anode electrolyte according to claim 6, wherein the tertiary amine and the inorganic acid are present in equimolar amounts.

* * * * *